(12) United States Patent
Vishtal et al.

(10) Patent No.: US 12,508,802 B2
(45) Date of Patent: Dec. 30, 2025

(54) RECYCLABLE CARDBOARD PACKAGING MATERIAL COMPRISING A METALLIZED BARRIER LAYER APPLIED BY TRANSFER METALLIZATION

(71) Applicant: SOCIETE DES PRODUITS NESTLE S.A., Vevey (CH)

(72) Inventors: Alexey Vishtal, Lausanne (CH); Johannes Zimmer, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 323 days.

(21) Appl. No.: 18/547,048

(22) PCT Filed: Feb. 18, 2022

(86) PCT No.: PCT/EP2022/054043
§ 371 (c)(1),
(2) Date: Aug. 18, 2023

(87) PCT Pub. No.: WO2022/175433
PCT Pub. Date: Aug. 25, 2022

(65) Prior Publication Data
US 2024/0149577 A1  May 9, 2024

(30) Foreign Application Priority Data

Feb. 22, 2021 (EP) ..................... 21158356

(51) Int. Cl.
*B32B 29/00* (2006.01)
*D21H 19/02* (2006.01)
(Continued)

(52) U.S. Cl.
CPC ........... *B32B 29/005* (2013.01); *D21H 19/02* (2013.01); *D21H 19/20* (2013.01); *D21H 19/58* (2013.01);
(Continued)

(58) Field of Classification Search
CPC .. D21H 19/02–08; D21H 19/80; D21H 19/82; D21H 19/84; B32B 27/10; B32B 2250/05; B32B 2439/70; B32B 29/005
(Continued)

(56) References Cited

U.S. PATENT DOCUMENTS

| | | | | |
|---|---|---|---|---|
| 4,424,260 A | * | 1/1984 | Pupp | ............... B65B 55/02 |
| | | | | 428/34.3 |
| 4,880,701 A | * | 11/1989 | Gibbons | ............ B32B 27/08 |
| | | | | 428/476.3 |

(Continued)

FOREIGN PATENT DOCUMENTS

| | | |
|---|---|---|
| AU | 2005202121 | 12/2005 |
| CN | 1049391 A | 2/1991 |

(Continued)

OTHER PUBLICATIONS

Russian Office Action for Appl No. 2023121846/05 dated Jun. 6, 2025, 12 pages.

(Continued)

*Primary Examiner* — Michael C Romanowski
(74) *Attorney, Agent, or Firm* — K&L Gates LLP

(57) ABSTRACT

The present invention concerns a paper-based barrier multilayer packaging material structure (1) being formed as a unitary sheet and comprising from its outer surface to its inner surface, the following layers: —a layer of water-based or solvent-less adhesive (6) having a thickness comprised between 1 μm and 10 μm, —at least one layer of a protective coating (5) having a thickness comprised between 1 μm and 10 μm, —a layer (4) of aluminum, aluminium oxide, or silicone oxide, —having an optical density equivalent of 2-5, —a release coating (3) having a thickness of 0.1 μm to (Continued)

2 μm, —at least one layer of a water-resistant polyolefin sealable coating (2) having a thickness of 10 to 50 μm, preferably of 25 to 35 μm.

6 Claims, 1 Drawing Sheet

(51) Int. Cl.
  *D21H 19/20* (2006.01)
  *D21H 19/58* (2006.01)
  *D21H 19/82* (2006.01)
  *D21H 19/84* (2006.01)

(52) U.S. Cl.
  CPC ............ *D21H 19/82* (2013.01); *D21H 19/84* (2013.01); *B32B 2250/05* (2013.01); *B32B 2255/12* (2013.01); *B32B 2255/205* (2013.01); *B32B 2255/26* (2013.01); *B32B 2255/28* (2013.01); *B32B 2439/70* (2013.01)

(58) Field of Classification Search
  USPC ................................................ 428/34.2, 34.3
  See application file for complete search history.

(56) References Cited

U.S. PATENT DOCUMENTS

| | | | |
|---|---|---|---|
| 5,021,298 A | 6/1991 | Revell | |
| 6,537,680 B1* | 3/2003 | Norlander | D21F 11/04 |
| | | | 428/536 |
| 2012/0100320 A1* | 4/2012 | Toft | B32B 27/32 |
| | | | 428/464 |
| 2013/0101855 A1* | 4/2013 | Cham | B32B 29/002 |
| | | | 428/512 |
| 2018/0311940 A1 | 11/2018 | Toft et al. | |
| 2018/0319559 A1* | 11/2018 | Toft | B65D 65/40 |
| 2019/0091976 A1* | 3/2019 | Roehrig | B32B 27/30 |
| 2020/0171796 A1* | 6/2020 | Backfolk | B32B 15/20 |
| 2022/0290377 A1* | 9/2022 | Paakkonen Alvim | |
| | | | D21H 19/04 |
| 2022/0340342 A1* | 10/2022 | Knöös | B65D 65/42 |
| 2023/0272584 A1* | 8/2023 | Vishtal | D21H 19/82 |
| | | | 206/524.3 |
| 2023/0365312 A1* | 11/2023 | Missoum | B32B 27/306 |

FOREIGN PATENT DOCUMENTS

| | | | | |
|---|---|---|---|---|
| CN | 108290372 A | 7/2018 | | |
| CN | 111099152 A | 5/2020 | | |
| CN | 112368443 A | 2/2021 | | |
| DE | 4445193 A1 | 7/1995 | | |
| EP | 1533417 B1 * | 8/2011 | ............ | D21H 19/08 |
| GB | 680998 A | 10/1952 | | |
| RU | 2236943 C2 | 9/2004 | | |
| WO | WO-0077300 A1 * | 12/2000 | ............ | D21H 19/02 |
| WO | 2011003565 | 1/2011 | | |
| WO | 2022175433 A1 | 8/2022 | | |

OTHER PUBLICATIONS

Chinese Office Action for Appl No. 202280011201.4 dated Jul. 22, 2025, 7 pages.

* cited by examiner

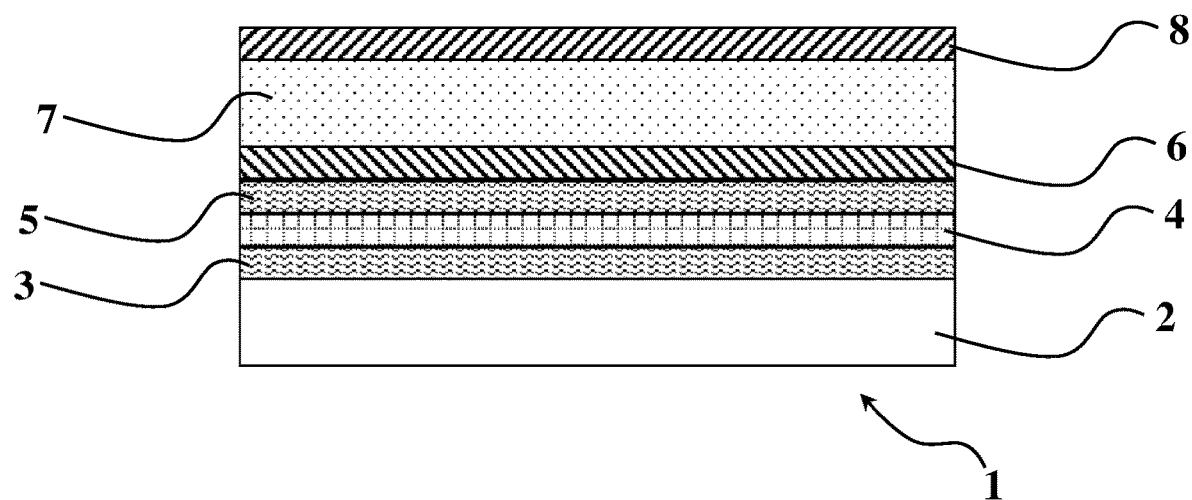

RECYCLABLE CARDBOARD PACKAGING MATERIAL COMPRISING A METALLIZED BARRIER LAYER APPLIED BY TRANSFER METALLIZATION

CROSS REFERENCE TO RELATED APPLICATIONS

The present application is a National Stage of International Application No. PCT/EP2022/054043, filed on Feb. 18, 2022, which claims priority to European Patent Application No. 21158356.2, filed on Feb. 22, 2021, the entire contents of which are being incorporated herein by reference.

FIELD OF THE INVENTION

The present invention concerns a packaging cardboard material having high barrier properties and being recyclable in the recycling paper stream, and a beverage carton made therefrom.

BACKGROUND OF THE INVENTION

Current packages for aseptic filling of edible liquids such as milk, fruit juices, tea or plant-based drinks, soft drinks, tomato puree, sauces or semi-liquid food formulations for instance, are often manufactured from multilayer materials having as paper or cardboard base to which at least one polymer and at least one metallic layer (with a minimum thickness of 6 micron) are assembled by extrusion or adhesive lamination. Such multilayer packaging materials are widely known and manufactured as flat blanks or continuous webs which are then folded and formed into three-dimensional articles that are sealed to form a closed package using induction, ultrasonic or heat transmission sealing.

Optionally, a thermoplastic spout and closure assembly can be leak-tightly assembled to the package to allow a consumer to easily dispense the contents.

Such packages are well known and are sold commercially under brand names "Tetra Brik® Aseptic", "Tetra Prisma® Aseptic", "Combibloc™" or "Combifit™", for example. Such packages are very user friendly, and extremely practical because they can be formed easily by folding as mentioned above, into packages of various formats and shapes (having e.g. square, round, elliptic cross sections) which are easy to stack in a compact assembly for transportation and storage. When stacked, for instance in a pallet, their shape is such that very little space is wasted in between two adjacent packages, which makes these packages an environmentally friendly solution from a transportation viewpoint.

Due to the sensitivity of many ingredients contained in edible liquids to oxidation, visible light, UV light and/or moisture-loss, packaging laminate materials typically known from the prior art comprise at least one external polymeric layer—for instance a low density polyethylene ("LDPE")—, a polymeric layer—for instance a low density polyethylene—used as a tie layer between a paperboard and the layer of aluminium foil that acts as a barrier, and one or several innermost layer(s) of polyethylene ("PE") acting as sealable media and barrier against water contained in product packaged therein.

Alternatively, the known prior art packaging multilayer structures cited above may also comprise, as a replacement of the oxygen-barrier aluminium foil layer mentioned above, a high-barrier polymeric film made from various techniques for metallization, in particular reactive and non-reactive Physical Vapour Deposition (PVD), in order to obtain for instance metallized polyethylene terepthalate ("PET-AlOx"), PET coated with a silicon oxide ("PET-SiOx"), a metallized polyethylene ("MetPE"), metallized oriented polypropylene ("OPP-Alox"). Also, the layer of PE between the paperboard and barrier layers can be replaced by an adhesive layer such as a polyurethane ("PU") layer.

Such laminated materials for manufacturing beverage carton packages are adapted for aseptic (or non-aseptic) filling process. Aseptic filling is a well-known technique which involves heating the liquid to be packed above a certain temperature, or to pass said liquid under a germ-killing light (typically ultraviolet light), or contact the packaging material with a chemical treatment (for instance ozone, hydrogen peroxide, or chlorine treatment), during a pre-determined amount of time, and then to fill the package which was previously treated with hydrogen peroxide or other sterilizing treatment, with said treated liquid in a controlled environment substantially deprived of most usual germs. Such an aseptic filling process guarantees that the shelf-life of the product will be extended, especially if the packed product is to be stored in ambient temperature conditions.

Due to the aseptic filling conditions, it is necessary that the packaging laminate material be resistant to temperatures, light, and chemicals used for decontamination as described above, and also to the temperatures applied to the ingredient or product which will be packed within said material. Such temperatures may be up to 95° C. for a short period of time (generally from 1 to 20 seconds, preferably between 3 and 10 seconds).

If they are to be recycled, such known packages need to be sorted out from other packaging waste and treated separately using specific recycling technologies. Such known packages are collected in mixed collecting facilities, then they are sorted out from other types of packages, either manually or by automated techniques such as Near-Infra-Red (NIR) sorting technologies. Then, they are recycled in a specific recycling stream where each of their specific constitutive material is sorted from others, and diverted to special recyclers. Such recycling process is complex, and therefore, the associated recycling fees, so-called "Extended Producer Responsibility" (EPR) fees, paid by the producer and/or the end user are high.

The recycling process for the above described known multilayer barrier packaging structures is very complex, and cannot be performed in simpler recycling processes used in particular for standard paper packaging. This is due to the fact that the overall contents of cellulosic fibres in the whole structure is not more than about 75%, the rest being plastic polymers (about 20% of the total structure) and metal (about 5% of the total structure).

The difficulty in recycling such structures is therefore due to the need to separate the various layers before they can be recycled separately; in particular, the beforementioned structures contain hydrophobic plastic materials on the inner and outer surface and the cellulosic fibres are "trapped" and cannot be recovered during standard repulping process. Even if a pre-treatment of the packages is performed, for instance shredding of the individual packages into flakes, in order to give access to fibres through the flakes' edges, repulping times would be higher than recycling a paper package, a corrugated cardboard, or any package made entirely of paper, or at least containing a high ratio of cellulosic fibres. More precisely, polyolefins such as polyethylene, and metal (e.g. aluminium) cannot be recycled in the same way as cellulosic-fiber containing layers (paper or cardboard).

When manufacturing multilayer packaging material structures today, applying a layer of plastic by known techniques, in particular extrusion (extrusion-lamination or extrusion-coating) (or similarly by an extrusion coating process) necessarily provides a high thickness of the plastic film thus obtained onto the paper. Polymer films obtained by extrusion have a thickness comprised between 15 µm and several millimetres (maximum 5-6 mm for most packaging applications).

The second issue with extruded polymers in multilayer structures as described above, is that even for low thicknesses of polymer applied to the substrate, the cohesive strength of the polymer film is very high and the level of adhesion of the polymer to the substrate is also high. This prevents such polymer to detach from the substrate when recycled, and prevents recycling and repulping of the cellulose portion in a paper-stream recycling process.

Therefore, later during the recycling process, the multilayer structure comprising a mixture of paper and plastic (polymer) films either extruded (by classic techniques as extrusion-lamination or extrusion coating), cannot be recycled in a paper-stream recycling process because a plastic layer having a thickness above 15 µm is too thick to be dispersed and at the same time the same layer has cohesion strength and adhesion level to the adjacent layers of the structure, which are way too high to be separated from the other layers of materials, especially from the paper fibres. The extruded plastic film remains intact within the paper pulp bath, hence making it difficult to recycle paper pulp from the repulping process.

More than that, the recycling process of known laminated materials described above is expensive, and energy consuming and characterized with relatively low yield of paper fibres that are recycled (around 60% from the total amount of packaging materials in the entire structure), hence, not sufficiently environmentally friendly from a disposal and recycling perspective. There is also room for improving the recyclability of the rest of the packaging material (i.e. the plastic polymer and the metal parts (e.g. aluminium parts).

Last but not least, a certain amount of said packages are not recycled, because some consumers do not clearly understand in which recycling stream such packages should be littered (either in the paper, or plastic, or metal trash bin).

An emerging way to improve barrier properties of paper is to coat paper with water-based polymer dispersions such as styrene-butadiene, EEA, PVOH, acrylate, PVDC, polyurethane, etc. In this case, the coating weight of applied polymer is in principle lower than that applied by classic extrusion technologies (extrusion-lamination or extrusion coating). Generally, the thickness of polymer applied to a surface coated by a water-based dispersion coating is in the range of 1 to 15 microns, generally, about 5 microns. Furthermore, even for the higher thicknesses of polymer applied to the substrate with a dispersion coating technique, the cohesive strength of the polymer film thus obtained is low and the level of adhesion of the same polymer to the substrate is also low. By "low" it is meant that during use, the resulting structure fulfils all the necessary mechanical strength criteria, but at the same time, the particles of polymer applied in dispersion to the substrate can easily detach in a repulping process as applied in paper-recycling streams. However, the drawback with dispersion coating alone is that it does not provide sufficient barrier properties to a paper-based packaging material.

Different multilayer structures were described in the past, that involve lamination of paper or cellulose-based material with cardboard, with additional barrier properties, for use in the packaging of food or beverage products.

U.S. Pat. No. 5,021,298 is a US patent application that discloses a laminated high barrier metallized plastic film. More precisely, this publication discloses the application to the surface of a polyolefin or regenerated cellulose film, of a thin but smooth layer of a plastic coating with relatively little inherent barrier, and metallizing over the coating. With such a structure, the applicant claims that a very high barrier can be achieved, generally at least a factor of ten and up to a factor of more than one thousand times better than the barrier of the metallized uncoated film. The smoothness of the coating is crucial to the invention. Therefore, it provides provided a flexible plastic film, coated on one or both faces with a thin coating to give a smooth finish, and metallised on one or both of the coated surfaces. The overall contents of cellulosic fibres in this structure is therefore very low, which forbids recycling of such structures in the paper recycling process. Furthermore, the requirements of metallizing a polymer and cellulosic fibre materials are very different, in particular in terms of adhesion requirements of metal atoms to the cellulosic medium due to the hygroscopic and porous nature of cellulosic fibre networks.

U.S. Pat. No. 6,472,081 is a US patent application that also discloses a metallized polymeric film. In this patent, the metallized layer is a very thin metallic layer of not more than 5 nm in thickness, which is deposited onto a core layer of polypropylene (PP) coextruded with a metallizable layer of ethylene vinyl alcohol copolymer (EVOH), polyvinyl alcohol (PVOH), or polyester, using vacuum metallization on a specific adhesive that strongly binds the metal atoms to the polymer atoms. This document does not deal with the requirements of metallizing a cellulosic medium, which are actually very different from adhesion requirements of metal atoms to a plastic polymer medium. More precisely, due to the presence of air and water vapour entrapped in between fibres of the cellulosic medium (which is not present in polymer films), the metallization of fibre-based cellulosic medium requires a much higher manufacturing equipment capacity to maintain an acceptable vacuum level around the cellulosic film during metallization. Metallization of cellulosic fibre medium is therefore more complex.

WO2011003565 is a PCT application to Tetra Laval, that discloses a non-foil packaging laminate for liquid food packaging comprising a layer of paper, which paper layer is situated towards the inner side of the laminated packaging material. The packaging laminate further comprises a gas barrier coating layer, coated onto the inner side of the paper layer by liquid film dispersion coating of a liquid gas barrier composition onto said paper layer and subsequent drying. The packaging laminate further comprises a supplemental barrier metal layer that is vapour deposited onto the dispersion coating already applied onto the inner surface of the paper layer. The invention also relates to a method for manufacturing of the packaging laminate and to a packaging container that is made from the packaging laminate. In order to provide a protection on the innermost and outermost sides of the laminate structure, as well as heat sealable capabilities, the packaging laminate disclosed in WO2011003565 further comprises inner and outer layers of polyolefins which are either extruded onto the already formed metallized paper, or laminated with the latter as an already formed polymer film.

Although a cost-effective packaging structure, the inner and outer layers are made of polyolefin films, extruded to the rest of the structure. As a result, the overall amount of plastic polymer in the structure is so high that it prevents recycling of the whole packaging material in a paper-stream recycling process, as it is the case for other multilayer packaging structures described above. In other words, recycling of a material disclosed in WO201103565 requires a complex recycling process to separate the high amount of strong polymer films from the paper layer, before each of them can be either recycled or repulped.

Having considered the above, there is a need for a packaging laminate material allowing to manufacture packages with the known forming techniques, that also have high barrier properties and a format that is efficient for stacking and transportation, as explained above, which has a greatly reduced amount of plastic polymer contents such that it can be recycled along with other paper packaging such as old corrugated cases ("OCC") or mixed paper waste, generally in a paper-stream recycling process. Further, there is a need for providing a packaging material that is highly resistant to abrasion, and especially wherein the metallic layer is not damaged by mechanical stress, during storage, transport, or usage of the packaging material.

SUMMARY OF THE INVENTION

The objectives set out above are met with a barrier multilayer packaging material structure being formed as a semi-rigid or rigid unitary sheet and comprising from its outer surface to its inner surface, the following layers:
  (i) at least one layer of a polymer dispersion coating selected within the list of: ethylene-acrylic or methacrylic acid copolymer, vinyl acetate, styrene acrylate, acrylic, modified polyvinylalcohol, ethyl acetate, polyhydroxyalcanoate (PHA) and their copolymers, polyurethane (PU), polybutylene adipate terephthalate (PBAT), polybutylene succinate (PBS), poly(butylene succinate-co-adipate) (PBSA), polylactic acid (PLA), or any mixture thereof, with or without a mineral filler, said coating having a thickness of 1 to 10 μm,
  (ii) a semi-rigid or rigid paperboard having a grammage of between 120 $g/m^2$ and 500 $g/m^2$,
  (iii) a layer of water-based or solvent-less adhesive selected within the list of: polyvinylacetate (PVAc), polyurethane (PU), acrylic, polyvinylalcohol (PVOH), ethylenevinylalcohol (EVOH), butenediol vinyl alcohol co-polymer (BVOH), a starch-based adhesive, or a mixture thereof, said adhesive layer having a thickness comprised between 1 μm and 10 μm,
  (iv) at least one layer of a protective coating selected within the list of: polyvinylalcohol (PVOH), ethylene ethyl acrylate (EEA), or polyurethane (PU), said protective coating having a thickness comprised between 1 μm and 10 μm,
  (v) a layer of aluminum having an optical density equivalent of 2-5, or aluminium oxide, or silicon oxide, applied with physical or chemical vapor deposition process, or with transfer metallization,
  (vi) a release coating selected within the list of: vinyl chloride, acrylic polymer, polyurethane (PU), nitrocellulose, or a mixture thereof, said release coating having a thickness of 0.1 μm to 4 μm,
  (vii) at least one layer of a water-resistant polyolefin sealable coating of any of the following: low density polyethylene (LDPE), linear low-density polyethylene (LLDPE), or an ethyl-acrylate blend with low density polyethylene (EEA-LDPE), said coating having a thickness of 10 to 50 μm, preferably of 25 to 35 μm.

According to the invention, the total fiber contents of said structure is comprised between 90% and 96% by weight.

By "inner side" of the packaging structure it is meant the side intended to face the filled food contents of a package produced from said packaging structure.

The invention provides a packaging material that is composed of a cardboard layer (also named "paperboard" or "carton" in the present specification), made predominantly of cellulose fibres joined by means of adhesive lamination using an adhesive that can be repulped, said paperboard layer being metallized with an extremely thin layer of metal atoms transferred by direct transfer metallization process. Direct transfer metallization process involves the transfer of a metallic layer from a first substrate, for instance a polyethylene terephthalate (PET) film, onto a second substrate: in the present case, the cardboard layer which is pre-coated with layers of adhesive and protective coating layers to prepare for the transfer of the metal.

Fibre-based packaging materials with a basis weight above 120 g/m2 are generally difficult to metallize due to significant water vapour and air release during the process of vacuumization. Release of vapour and air are difficult to control and adversely affect barrier obtained on thick fibre-based packaging substrates. Thus transfer metallized process where metallization is performed on PET film and only consequently transferred to board, is more adequate for creating a high barrier to water vapour and oxygen on paperboard.

Furthermore, the multilayer structure according to the present invention comprises a dispersion coated layer of heat sealable coating providing a tight sealing at its outer surface.

Due to dispersion coating, the overall thickness of polymer material in the structure is extremely reduced compared to the thickness of paperboard (i.e. cardboard) material, therefore the inventors have achieved to overcome the technical limitations of the known multilayer barrier structures, and achieve a packaging multilayer structure with excellent barrier properties against oxygen and moisture transfer, as well as resistance to liquid contact from their inner or outer surfaces, while achieving a total contents of cellulosic fibres comprised preferably between 90% and 96% of the overall material weight. Furthermore, dispersion coating of polymer avoids high cohesion and high adhesion of the polymer and therefore solves the recyclability problem (solid particles of polymer dispersed in a watercarrier medium instead of liquid polymer applied to substrate). The fact that the inventors succeeded in forming a multilayer structure with only a small amount of polymer layers formed by extrusion (extrusion-lamination or extrusion coating), provides a multilayer structure with a ratio of cellulosic material to non-cellulosic material, which is extremely high in cellulose contents, and wherein the polymer layers are easy to disintegrate in a paper repulping bath due to the relatively low cohesion strength of the polymer, and also the relatively low adhesion of the same polymer to the rest of the substrate (especially the cellulosic layers). The resulting structure therefore demonstrates excellent paper-stream recycling capabilities.

Multilayer packaging structures according to the present invention are well adapted for producing carton bricks for aseptic filling. However, cartons for aseptic filling are not the only types of packages that can be formed out of the structure. Generally, any type of package formed from a flat blank into a 3D packaging, is applicable too. Especially, the structure according to the present invention can be used for packing liquid, semi-liquid, gel, solid, particle, powdered products or mixtures thereof. For instance, it can be used for forming capsules, pods or pads for roast and ground coffee, or powdered soluble products, for use in beverage preparation systems. It can also be used for forming beverage bottles, or for forming flexible, rigid, or semi-rigid sachets for particle or powdered edible products such as snacks, pet food, nutritional products for instance. Alternatively, they can be used for forming packages for ice-cream.

Furthermore, in a preferred embodiment of the invention, the interlayer adhesion strength measured between each of the aforementioned layers is above 1.5N/15 mm, preferably comprised between 5 and 10 N/15 mm.

In one embodiment, the structure is inversed, such that the transfer metallized layer is applied on the side of the cardboard which is turned to the outer surface of the material structure.

Preferably, the paperboard layer is a multilayer paperboard comprising either:
- an external layer of pigment coating, or bleached chemical pulp, a middle layer composed of bleached or unbleached chemi-thermo-mechanical pulp, or thermomechanical pulp, or unbleached chemical pulp, and an inner layer composed of unbleached chemical pulp, or
- an external layer of pigment-coated bleached chemical pulp, a middle layer of bleached chemi-thermo-mechanical pulp, or bleached chemical pulp, and an inner layer composed of bleached chemical pulp.

In one embodiment, unbleached pulp can be also present outside or inside of the structure.

Preferably, the bending stiffness of said material measured at 15° angle bend in machine direction according to ISO 2493 standard test procedure, is comprised between 200-700 mN.

The present invention is further directed to a package made of a barrier multilayer structure as described above, having excellent moisture, liquid, and gas (especially oxygen) barrier properties.

It is easily recyclable in a paper-stream recycling process and due to its very high contents in cellulosic fibres, a repulping process is easy, efficient, and cost-effective, with a ratio of cellulose fibres to the overall weight of the package similar to what is obtained when recycling conventional paper or cardboard packages.

Such a package can be used for packing all sorts of products in liquid, semi-liquid, powder or flakes form, either for human and/or animal consumption. Preferably, a package constructed from the packaging structure according to the invention is particularly adapted to packing food or beverage products. It provides long shelf-life capabilities (at least 6 months), and particularly efficient barrier against liquid, moisture and oxygen transfer. Also, a package made from the structure according to the invention provides excellent light barrier, as well as barrier against fat transfer.

The manufacturing process of such a package is not described in the present specification in further details, as it corresponds to forming, filling, and sealing processes which are well known in the art of forming packages from flat multilayer structures, that are folded, and then sealed along their edges to form a closed package.

Advantageously, the package comprises a dispensing wall pierceable by means of a drinking straw (made of paper, carton, or any other suitable material), and/or it comprises an integrated plastic spout of the known type having a closure. In the latter case, the spout and closure are preferably manufactured from an easily recyclable, or compostable plastic material (e.g. PHA, PLA, PBS, PBAT, recycled polyolefins, or a combination thereof).

BRIEF DESCRIPTION OF THE DRAWINGS

Additional features and advantages of the present invention are described in, and will be apparent from, the description of the presently preferred embodiments which are set out below with reference to the drawings in which:

FIG. 1 is a schematic representation of a cross-section of a preferred embodiment of a multilayer barrier structure according to the invention.

DETAILED DESCRIPTION OF THE INVENTION

Generally, in the present specification, by "extrusion coating", it is meant a method to provide a thick layer of polymer by using an extruder which forces melted thermoplastic resin (e.g. polyethylene) through a horizontal slot-die onto a moving web of substrate (e.g. paper). The resulting product is a permanently coated web structure.

By "extrusion lamination", it is meant a similar process to extrusion coating, whereby a polymer resin is extruded between two substrates (e.g. a layer of paper and another layer of polymeric film), and acts as a bonding agent.

By "adhesive lamination", it is meant a process whereby one paper material is coated with adhesive and laminated to a second paper or paperboard material.

In a lamination process, two thick layers of material are combined, either by extrusive lamination or adhesive lamination, whereby the thickness of each layer is far greater than the thickness obtained by dispersion coating.

By "dispersion coating", it is meant a coating technique whereby an aqueous dispersion of fine polymer particles or polymer solution is applied to the surface of paper or board as such, in order to form a solid, non-porous film after drying. Dispersion coating can be performed by gravure, flexo-gravure, rod, blade, slot-die, curtain air knife, or any other known method of paper coating. Dispersion coating can create a much thinner layer than extrusion, since the polymer is mixed in an aqueous water solution. This brings advantages in terms of quantity of polymer usage, its barrier performance and recyclability of resulting paper structure. The target of dispersion coating is to achieve a barrier layer against water, water vapour, grease, oil, gas, etc. by environmentally friendly coating. Another target is to prepare surface of cellulosic material for a vacuum deposition process In FIG. 1 is illustrated a preferred embodiment of the invention. In this FIGURE is shown a multilayer structure 1 comprising the several layers, described in the following, starting from the inner layer (i.e. the layer that will eventually be in contact with the packed product, once said structure is formed into a package), then to the outer layer (i.e. the layer which is in contact with outside atmosphere, once said structure is formed into a package).

In the specific example of a structure 1 according to the invention, as illustrated in FIG. 1, the first—innermost—layer 2 is a liquid tight sealable layer of polyethylene (PE) with a thickness of 27 μm. This layer ensures sealability of the structure to be able to seal a formed package along its edges, in order to realize a finished package. It is also essential for aseptic filling, providing protection from outside liquid contact during the filling process, so as to protect the internal liquid-sensitive layers against liquid degradation ("soggy effect"), hence preserving the overall structure integrity.

The next layer is a release coating layer 3 composed of vinyl chloride, with a thickness of 0.7 μm.

The next layer 4 is a vacuum deposited layer of aluminum of optical density of 3.

The next layer 5 is a layer of protective coating composed of polyvinylidene dichloride (PVDC) with a thickness of 3 μm.

The next layer 6 is a lamination adhesive with a thickness 3 μm and composed of polyurethane (PU).

The next layer 7 is a paperboard layer having a grammage of 300 g/m². This paperboard (or cardboard) layer is composed of several layers of bleached, unbleached, and chemi-thermo-mechanical pulp. This layer provides stiffness to the overall structure 1. However, its thickness is chosen such that it is not too stiff, and the final structure 1 can be folded to form a package in a conventional Form-Fill-Seal (FFS) process, to manufacture brick and tube-type tight packages.

The last—outermost—layer 8 is a polymer dispersion coating made of (in this example) styrene acrylate with 30% mineral filler. This layer has a thickness of 5 μm. Its role is to protect the other layers of the structure against mechanical and chemical damages, and provide liquid tightness from the external environment.

The overall contents of cellulosic fibres in this structure is 95% which ensures excellent recycling efficiency in a paperstream process. The ratio between the cellulosic components to the plastic components is very high, and repulpability process of the overall material provides excellent results.

The flexible packaging material structure of the present invention may be a packaging material for a food product. It may be a primary packaging material, a secondary packaging material or a tertiary packaging material, for example. A primary packaging material for a food product is in direct contact with the actual food product. A secondary packaging material for a food product may be a packaging material for a food product that helps secure one or more food products contained in a primary packaging. Secondary packaging material is typically used when multiple food products are provided to consumers in a single container. A tertiary packaging material for a food product may be a packaging material for a food product that helps secure one or more food products contained in a primary packaging and/or in a primary and secondary packaging during transport.

For some applications of the present invention it may be preferred if the polymer dispersion coated packaging material is non-porous. The ratio of pore volume to total volume of the paper material is called the porosity of the paper material. For the purpose of the present invention, a cardboard material shall be considered as non-porous if it has a porosity of less than 40%, for example, less than 30% or less than 20%. Additionally or alternatively, as porosity can also be measured via the air permeability of the material that is tested, the cardboard material described in the present invention may have an air permeability of less than 10 ml/min. Hence, in one embodiment of the present invention, the material is non-porous cardboard material.

For the purpose of the present invention, the dispersion coating may be, for example, one or a plurality of layers comprising acrylic acid copolymers, polyesters, polyhydroxyalkanoates, native and chemically modified starches, xylan and chemically modified xylan, polyvinylidene dichloride, polyvinyl alcohol, ethyl-vinyl alcohol, vinyl acetate, ethyl-vinyl acetates, cellulose nitrate, waxes, micro-fibrillated cellulose, polyolefins, silanes, polyurethanes, or combinations thereof. However, preferably, it is deprived of polyolefins.

With a dispersion coating technology, the layer of dispersion-coated polymer onto the paper layer has a thickness which is comprised within a range of 1 μm to 10 μm, preferably within a range comprised between 3 μm and 7 μm. More preferably, the dispersion-coated layer of polymer has a thickness of about 5 μm, and in any case within the range otherwise provided in the present specification.

It should be understood that various changes and modifications to the presently preferred embodiments described herein will be apparent to those skilled in the art. Such changes and modifications can be made without departing from the scope of the present invention and without diminishing its attendant advantages. It is therefore intended that such changes and modifications be covered by the appended claims.

The invention claimed is:

1. A barrier multilayer packaging material structure being formed as a semi-rigid or rigid unitary sheet and comprising from its outer surface to its inner surface, the following layers:
   (i) at least one layer of a polymer dispersion coating selected within the group consisting of: ethylene-acrylic or methacrylic acid copolymer, vinyl acetate, styrene acrylate, acrylic, modified polyvinylalcohol, ethyl-vinyl acetate, polyhydroxyalkanoate (PHA) and their copolymers, polyurethane (PU), polybutylene adipate terephthalate (PBAT), polybutylene succinate (PBS), poly(butylene succinate-co-adipate) (PBSA), polylactic acid (PLA), or any mixture thereof, with or without mineral filler, said coating having a thickness of 1 to 10 μm,
   (ii) a semi-rigid or rigid paperboard having a weight of between 120 g/m² and 500 g/m²,
   (iii) a layer of water-based or solvent-less adhesive selected within the group consisting of: polyvinylacetate (PVAc), polyurethane (PU), acrylic, polyvinylalcohol (PVOH), ethylenevinylalcohol (EVOH), butenediol vinyl alcohol co-polymer (BVOH), a starch-based adhesive, and a mixture thereof, said adhesive layer having a thickness of between 1 μm and 10 μm,
   (iv) at least one layer of a protective coating selected within the group consisting of: polyvinylalcohol (PVOH), ethylene ethyl acrylate (EEA), and polyurethane (PU), said protective coating having a thickness of between 1 μm and 10 μm,
   (v) a layer of aluminum having an optical density equivalent of 2-5,
   (vi) a release coating selected within the group consisting of: vinyl chloride, acrylic polymer, polyurethane (PU), nitrocellulose, and a mixture thereof, said release coating having a thickness of 0.1 μm to 4 μm,
   (vii) at least one layer of a water-resistant polyolefin sealable coating selected from the group consisting of: low density polyethylene (LDPE), linear low-density polyethylene (LLDPE), and an ethylene ethyl acrylate blend with low density polyethylene (EEA-LDPE), said sealable coating having a thickness of 10 to 50 μm, and
   wherein the total fiber contents of said structure is between 90% and 96% by weight.

2. A barrier multilayer packaging material structure according to claim 1, wherein the interlayer adhesion strength measured between each of the aforementioned layers is above 1.5 N/15 mm.

3. A barrier multilayer packaging material structure according to claim 1, wherein the paperboard is a multilayer paperboard comprising either:
- an external layer of pigment coating, or bleached chemical pulp, a middle layer composed of bleached or unbleached chemi-thermo-mechanical pulp, or thermo-mechanical pulp, or unbleached chemical pulp, and an inner layer composed of unbleached chemical pulp, or
- an external layer of pigment-coated bleached chemical pulp, a middle layer of bleached chemi-thermo-mechanical pulp, or bleached chemical pulp, and an inner layer composed of bleached chemical pulp.

4. A barrier multilayer packaging material structure according to claim 1, wherein the bending stiffness of said material structure measured at 15° angle bend in machine direction according to ISO 2493 standard test procedure, is between 200-700 mN.

5. A package made of a paper-based barrier multilayer structure being formed as a semi-rigid or rigid unitary sheet and comprising from its outer surface to its inner surface, the following layers:
- (i) at least one layer of a polymer dispersion coating selected within the group consisting of: ethylene-acrylic or methacrylic acid copolymer, vinyl acetate, styrene acrylate, acrylic, modified polyvinylalcohol, ethyl-vinyl acetate, polyhydroxyalkanoate (PHA) and their copolymers, polyurethane (PU), polybutylene adipate terephthalate (PBAT), polybutylene succinate (PBS), poly(butylene succinate-co-adipate) (PBSA), polylactic acid (PLA), or any mixture thereof, with or without mineral filler, said coating having a thickness of 1 to 10 μm,
- (ii) a semi-rigid or rigid paperboard having a weight of between 120 g/m² and 500 g/m²,
- (iii) a layer of water-based or solvent-less adhesive selected within the group consisting of: polyvinylacetate (PVAc), polyurethane (PU), acrylic, polyvinylalcohol (PVOH), ethylenevinylalcohol (EVOH), butenediol vinyl alcohol co-polymer (BVOH), a starch-based adhesive, and a mixture thereof, said adhesive layer having a thickness of between 1 μm and 10 μm,
- (iv) at least one layer of a protective coating selected within the group consisting of: polyvinylalcohol (PVOH), ethylene ethyl acrylate (EEA), and polyurethane (PU), said protective coating having a thickness of between 1 μm and 10 μm,
- (v) a layer of aluminum having an optical density equivalent of 2-5,
- (vi) a release coating selected within the group consisting of: vinyl chloride, acrylic polymer, polyurethane (PU), nitrocellulose, and a mixture thereof, said release coating having a thickness of 0.1 μm to 4 μm,
- (vii) at least one layer of a water-resistant polyolefin sealable coating selected from the group consisting of: low density polyethylene (LDPE), linear low-density polyethylene (LLDPE), and an ethylene ethyl acrylate blend with low density polyethylene (EEA-LDPE), said sealable coating having a thickness of 10 to 50 μm, and wherein the total fiber contents of said structure is between 90% and 96% by weight.

6. A package according to claim 5, which comprises a dispensing wall pierceable by a drinking straw, and a plastic spout with a closure, said spout and closure being manufactured from a recyclable or compostable plastic material.

* * * * *